United States Patent
Wang et al.

(10) Patent No.: US 8,060,488 B2
(45) Date of Patent: Nov. 15, 2011

(54) SYSTEM AND METHOD FOR CLASSIFYING AND DEFINING RELATIONSHIPS BETWEEN PRODUCT INFORMATION DATA

(75) Inventors: Chi-Chih Wang, Taipei Hsien (TW); Yong-Hua Song, Shenzhen (CN); Rui-Jun Wang, Shenzhen (CN); Shan-Sheng Wu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 470 days.

(21) Appl. No.: 12/329,608

(22) Filed: Dec. 7, 2008

(65) Prior Publication Data
US 2009/0171880 A1   Jul. 2, 2009

(30) Foreign Application Priority Data
Dec. 27, 2007   (CN) .......................... 2007 1 0203466

(51) Int. Cl.
*G06F 17/30* (2006.01)

(52) U.S. Cl. ........ 707/706; 707/737; 707/756; 707/778; 707/791; 707/795; 707/797; 707/828; 707/829; 707/956

(58) Field of Classification Search .................. 707/706, 707/737, 791, 797, 956, 756, 778, 795, 828, 707/829
See application file for complete search history.

(56) References Cited

U.S. PATENT DOCUMENTS

| | | | | |
|---|---|---|---|---|
| 5,765,039 | A * | 6/1998 | Johnson ........................ | 719/328 |
| 6,442,554 | B1 * | 8/2002 | Reddy et al. .................. | 707/794 |
| 6,484,177 | B1 * | 11/2002 | Van Huben et al. ................. | 1/1 |
| 6,609,129 | B1 * | 8/2003 | Luh ............................... | 707/797 |
| 6,711,585 | B1 * | 3/2004 | Copperman et al. .................. | 1/1 |
| 6,742,003 | B2 * | 5/2004 | Heckerman et al. .......... | 398/189 |
| 6,985,144 | B2 * | 1/2006 | Chang .......................... | 345/423 |
| 7,158,975 | B2 * | 1/2007 | Mazzagatti ................... | 707/797 |
| 7,305,419 | B1 * | 12/2007 | Cosby et al. .......................... | 1/1 |
| 7,577,579 | B2 * | 8/2009 | Watarai et al. ............... | 705/7.31 |
| 7,797,271 | B1 * | 9/2010 | Bonneau et al. ............. | 705/343 |
| 7,831,534 | B2 * | 11/2010 | Babikov et al. ................. | 706/45 |
| 2007/0038516 | A1 * | 2/2007 | Apple et al. ..................... | 705/14 |
| 2008/0015958 | A1 * | 1/2008 | Vanker et al. ................... | 705/28 |
| 2008/0109458 | A1 * | 5/2008 | Cosby et al. .................. | 707/100 |
| 2008/0140603 | A1 * | 6/2008 | Babikov et al. ................. | 706/59 |
| 2010/0100558 | A1 * | 4/2010 | Bakalash et al. ............. | 707/756 |
| 2010/0145945 | A1 * | 6/2010 | Episale et al. ............... | 707/736 |
| 2011/0060732 | A1 * | 3/2011 | Bonneau et al. ............. | 707/722 |
| 2011/0106785 | A1 * | 5/2011 | Loftus et al. ................. | 707/706 |

* cited by examiner

*Primary Examiner* — Thanh-Ha Dang
(74) *Attorney, Agent, or Firm* — Altis Law Group, Inc.

(57) ABSTRACT

A system and method for classifying and defining relationships between product information data is provided. The method classifies the product information data to two different data types. Each data type includes a plurality of items. The items of each of the two types are arranged in a product information tree. The items of all the product information trees are associated to construct a new tree for showing the relationships of the product information data.

9 Claims, 3 Drawing Sheets

SYSTEM AND METHOD FOR CLASSIFYING AND DEFINING RELATIONSHIPS BETWEEN PRODUCT INFORMATION DATA

BACKGROUND

1. Field of the Invention

Embodiments of the present disclosure relate to product information management systems and methods, and more particularly to a system and method for classifying and defining relationships between product information data.

2. Description of Related Art

Various product information systems are employed in manufacturing plants to maintain product quality. Product information may be held or stored in different information systems located in various departments, such as production departments, sales departments, and warehouses of a factory. Because product information is kept in different locations, it is difficult for managers to analyze and manage the product information.

Further, product information is usually stored in a linear structure, without a clear means to know the relationships among various items of the product information in the product information system, so it is inconvenient for users.

Therefore, an effective system and method for configuring product information is desired to overcome the above-described shortcomings.

DETAILED DESCRIPTION OF CERTAIN INVENTIVE EMBODIMENTS

All of the processes described below may be embodied in, and fully automated via, functional modules executed by one or more general purpose processors. The functional modules may be stored in any type of non-transitory computer-readable medium or other computer storage device. Some or all of the methods may alternatively be embodied in specialized computer hardware or communication apparatus.

Figure 1:
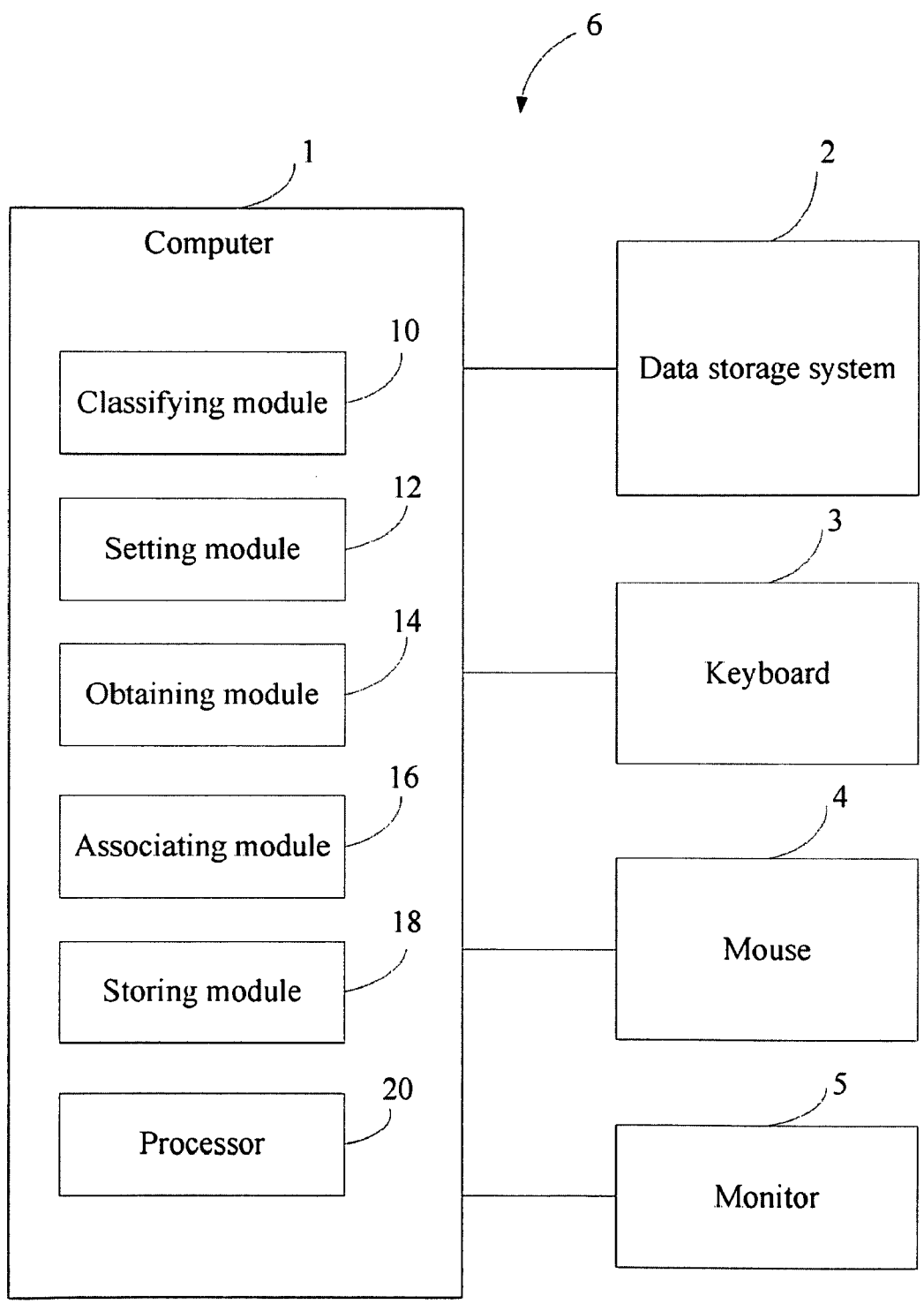
FIG. 1 is a block diagram of one embodiment of a system for classifying and defining relationships between product information data.

FIG. 1 is a block diagram of one embodiment of a system 6 for classifying and defining relationships between product information data (hereinafter, "the system 6"). In one embodiment, product information data may include a plant name, a process name, a production line name/number, a part name, a part number, a part version, for a computer part or an automobile part, for example. In one embodiment, the system 6 includes a computer 1, and a data storage system 2 connected to the computer 1. The product information data are stored in the data storage system 2. The data storage system 2 may include a tree construction table and a product information list, which are used to store product information during the process of configuring the product information. The computer 1 connects with a keyboard 3, a mouse 4, and a monitor 5, which are used as input and output devices.

In one embodiment, the computer 1 may include a classifying module 10, a setting module 12, an obtaining module 14, an associating module 16, and a storing module 18. It may be understood that one or more specialized or general purpose processors 20 may be used to execute the functional modules 10, 12, 14, 16, and 18. These functional modules may be used to perform certain functions for configuring the product information.

Figure 3:
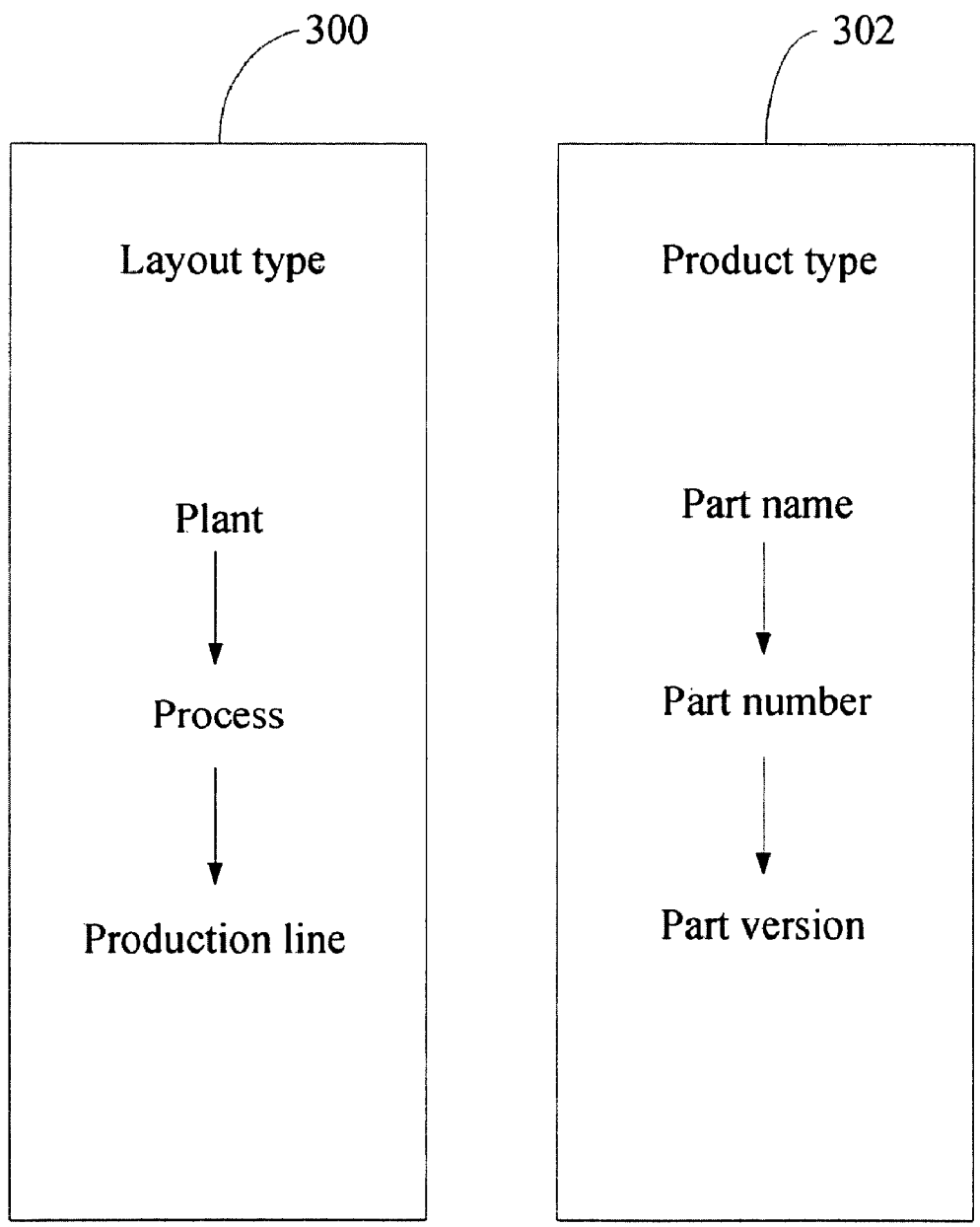
FIG. 3 shows one embodiment of product information tree.

The classifying module 10 is configured for classifying the product information stored in the data storage system 2 into a first data type and a second data type according to user determined requirements. Each data type includes a plurality of items. Each item shows a sub-type of the production information data. Referring to FIG. 3, the classifying module 10 may classify the product information data into a first data type defined as a layout type 300 and a second data type defined as a product type 302. The layout type 300 includes the items about production flow. The product type 302 includes the items about product attributes. In one embodiment, items of the layout type 300 may include which plants do manufacturing, the process used in the manufacturing, and which production lines that were used. Items of the product type 302 may include a part name, a part number, and a part version, for example.

The setting module 12 is configured for defining relationships between the items of the first data type and between the items of the second data type. In one embodiment, there are many processes in a plant. One process may have many production lines. So the setting module 12 defines the relationship between the process and the plant as an affiliation. The setting module 12 defines the relationship between the production line and the process as an affiliation. The setting module 12 is further configured for arranging the items of the first data type into a first product information tree according to the relationships between the items of the first data type, and arranging the items of the second data type into a second product information tree according to the relationships between the items of the second data type. In one embodiment, because of the affiliation between the process and the plant, the process is a child node of the plant in the first product information tree.

The obtaining module 14 is configured for obtaining product information data about the items of the first data type and the second data type from the data storage system 2, and for assigning the product information data to the corresponding items. For example, the process used in manufacturing a computer part includes an assembly process and a painting process. The obtaining module 14 obtains the assembly process and the painting process, and assigns the assembly process and the painting process to the process.

The obtaining module 14 is also configured for storing information of each child node, and a parent node corresponding to each child node of the first data type and the second data type into the tree construction table in the data storage system 2.

The associating module 16 is configured for integrating the items of the first data type and the second data type to construct a third product information tree by associating a leaf node of the first product information tree with a corresponding root node of the second product information tree.

The storing module 18 is configured for storing the leaf nodes of the first product information tree, and the leaf nodes of the second product information tree into the product information list in the data storage system 2. The storing module 18 is further configured for outputting the third product information tree to the monitor 5 or to a printing device for displaying the relationships of the product information.

Figure 2:
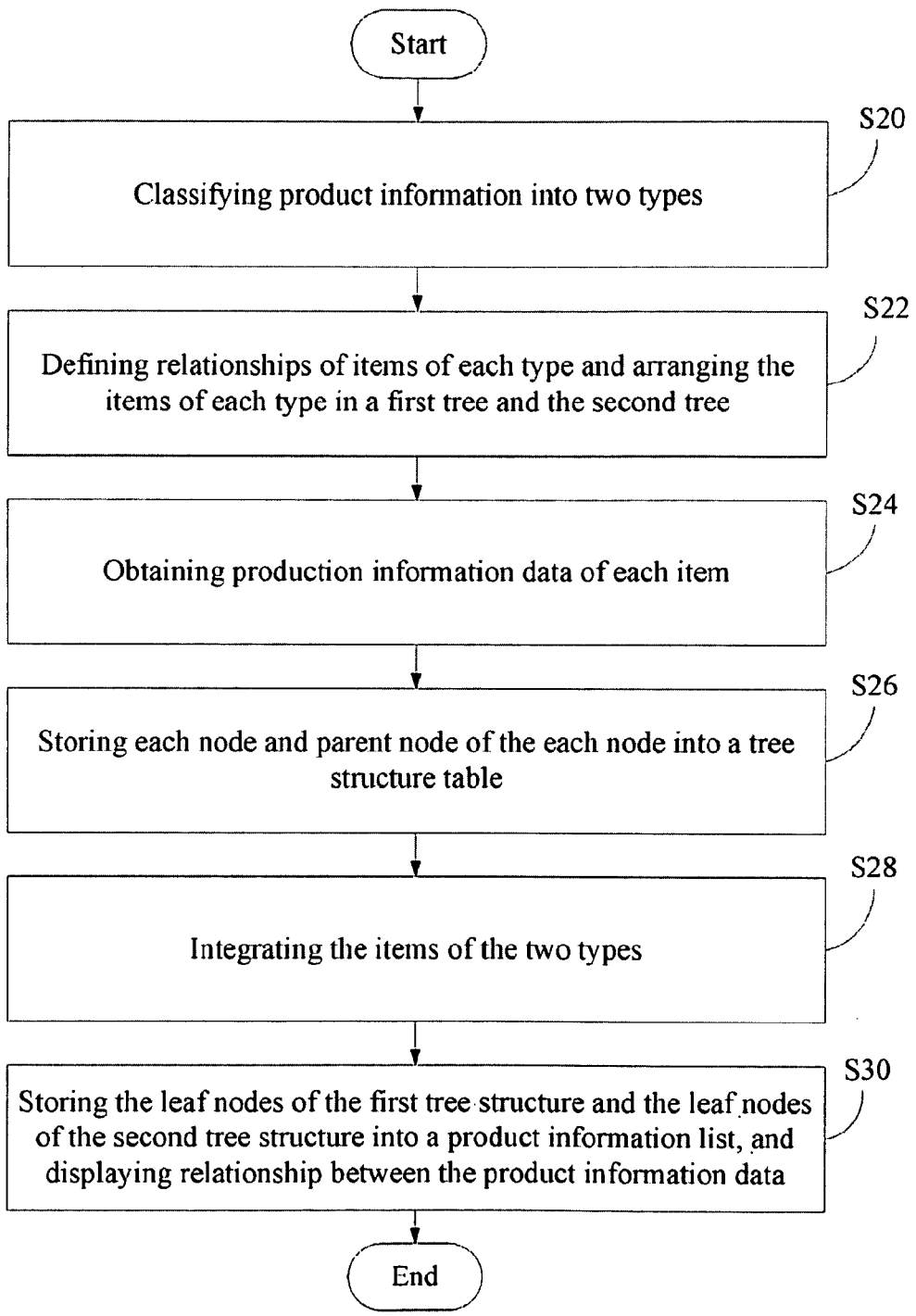
FIG. 2 is a flowchart of one embodiment of a method for classifying and defining relationships between product information data.

FIG. 2 is a flowchart of one embodiment of a method for configuring product information. Depending on the embodiment, additional blocks may be added, others removed, and the ordering of the blocks may be changed.

In block S20, product information stored in the data storage system 2 is classified into a first data type and a second data type by the classifying module 10 according to user determined requirements. Each data type includes a plurality of items. Each item shows a sub-type of the production information data.

In block S22, the setting module 12 defines relationships between items of the first data type. The setting module 12 also defines relationships between items of the second data type.

In block S24, according to the relationships between the items of the first data type, the items of the first data type are arranged into a first product information tree. According to the relationships between the items of the second data type, the items of the second data type are arranged into a second product information tree by the setting module 12.

In block S26, the obtaining module 14 obtains product information data about the items of the first data type and the second data type from the data storage system 2 and assigns the product information data to the corresponding items. The obtaining module 14 stores information of each child node, and a parent node corresponding to each child node of the first data type and the second data type into the tree construction table in the data storage system 2.

In block S28, the associating module 16 integrates the items of the first data type and the second data type to construct a third product information tree by associating a leaf node of the first product information tree with a corresponding root node of the second product information tree.

In block S30, the leaf nodes of the first product information tree, and the leaf nodes of the second product information tree are stored into a product information list in the data storage system 2 by the storing module 18. Further, the storing module 18 outputs the third product information tree to the monitor 5 or to a printing device for displaying the relationships of the product information.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for classifying and defining relationships between product information data, the computing system comprising:
    a classifying module configured for classifying product information stored in a data storage system into a first data type and a second data type according to user determined requirements;
    a setting module configured for defining relationships between items of the first data type and between items of the second data type, and for arranging the items of the first data type into a first product information tree, and arranging the items of the second data type into a second product information tree;
    an obtaining module configured for obtaining product information data about the items of the first data type and the second data type from the data storage system, and for assigning the product information data to the corresponding items;
    an associating module configured for integrating the items of the first data type and the second data type to construct a third product information tree by associating a leaf node of the first product information tree with a corresponding root node of the second product information tree;
    a storing module configured for storing leaf nodes of the first product information tree, and leaf nodes of the second product information tree into a product information list in the data storage system; and
    at least one processor for executing the classifying module, the setting module, the obtaining module, the associating module, and the storing module.

2. The computing system of claim 1, wherein the storing module is further configured for outputting the third product information tree to a display and/or a printing device to display relationships of the product information.

3. The computing system of claim 1, wherein the obtaining module is further configured for storing information of each child node, and a parent node corresponding to each child node of the first data type and the second data type into a tree construction table in the data storage system.

4. A computer-implemented method for classifying and defining relationships between product information data, the method comprising:
    classifying product information stored in a data storage system into a first data type and a second data type according to user determined requirements;
    defining relationships between items of the first data type and between items of the second data type;
    arranging the items of the first data type into a first product information tree, and arranging the items of the second data type into a second product information tree;
    obtaining product information data about the items of the first data type and the second data type from the data storage system and assigning the product information to the corresponding items;
    integrating the items of the first data type and the second data type to construct a third product information tree by associating a leaf node of the first product information tree with a corresponding root node of the second product information tree; and
    storing leaf nodes of the first product information tree and leaf nodes of the second product information tree into a product information list in the data storage system.

5. The computer-implemented method of claim 4, further comprising:
    outputting the third product information tree to a display and/or a printing device to display relationships of the product information.

6. The computer-implemented method of claim 4, further comprising:
    storing information of each child node, and a parent node corresponding to each child node of the first data type and the second data type into a tree construction table in the data storage system.

7. A non-transitory computer-readable medium having stored therein instructions that, when executed by a computer, cause the computer to perform a method for configuring product information, the method comprising:
    classifying product information stored in a data storage system into a first data type and a second data type according to user determined requirements;
    defining relationships between items of the first data type and between items of the second data type;
    arranging the items of the first data type into a first product information tree, and arranging the items of the second data type into a second product information tree;
    obtaining product information data about the items of the first data type and the second data type from the data storage system and assigning the product information to the corresponding items;

integrating the items of the first data type and the second data type to construct a third product information tree by associating a leaf node of the first product information tree with a corresponding root node of the second product information tree; and storing leaf nodes of the first product information tree and leaf nodes of the second product information tree into a product information list in the data storage system.

8. The non-transitory computer-readable medium of claim 7, wherein the method further comprises:

outputting the third product information tree to a display and/or a printing device to display relationships of the product information.

9. The non-transitory computer-readable medium of claim 7, wherein the method further comprises:

storing information of each child node, and a parent node corresponding to each child node of the first data type and the second data type into a tree construction table in the data storage system.

* * * * *